(No Model.)
N. T. HENDERSON.
COTTON CHOPPER.
No. 462,705. Patented Nov. 10, 1891.
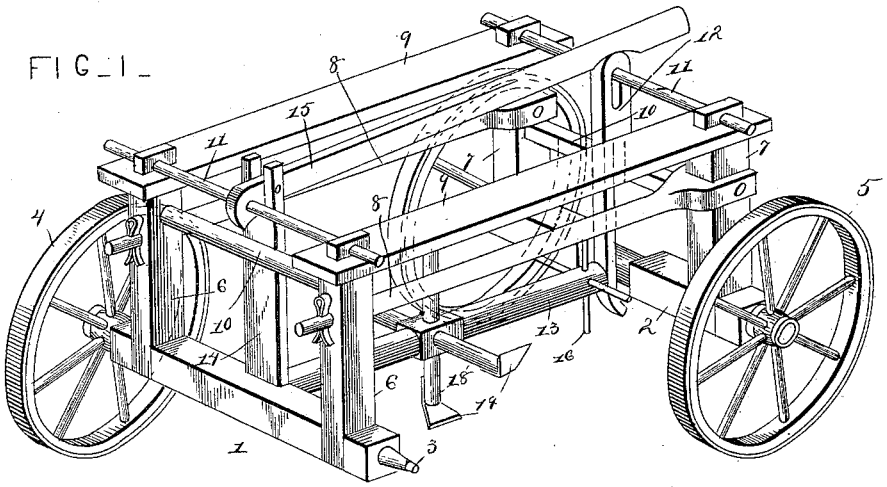
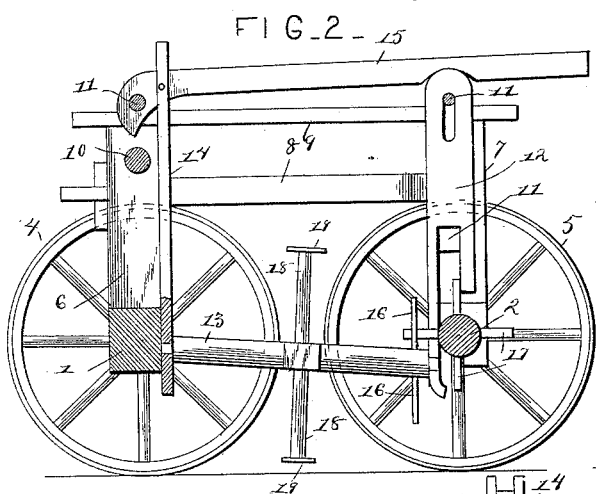
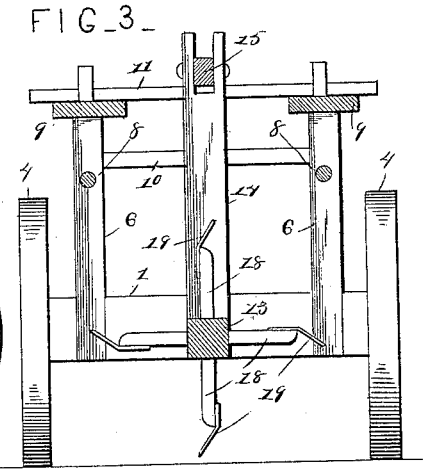
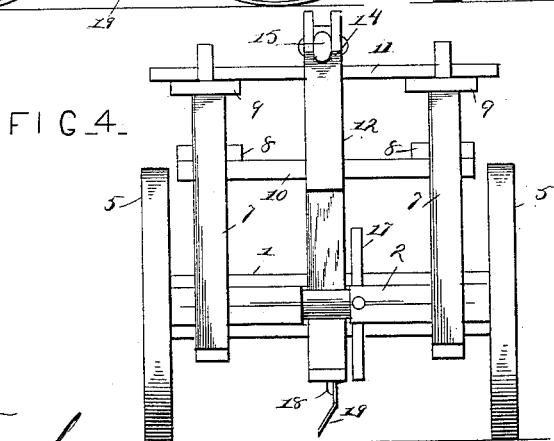
Witnesses
Geo. E. Frech.
Wm. Bagger
Inventor
Neely T. Henderson
By his Attorneys,
C. A. Snow & Co.

UNITED STATES PATENT OFFICE.

NEELY TRIMMIER HENDERSON, OF SARDIS, ASSIGNOR OF ONE-HALF TO WILLIAM F. SMITH, OF LINDEN, TEXAS.

COTTON-CHOPPER.

SPECIFICATION forming part of Letters Patent No. 462,705, dated November 10, 1891.

Application filed February 27, 1891. Serial No. 383,065. (No model.)

*To all whom it may concern:*

Be it known that I, NEELY TRIMMIER HENDERSON, a citizen of the United States, residing at Sardis, in the county of Cass and State of Texas, have invented a new and useful Cotton-Chopper, of which the following is a specification.

This invention relates to cotton-choppers; and it has for its object to provide a device of this class which shall be simple in construction, easily operated, and by means of which the cotton may be easily, quickly, and accurately thinned or chopped, leaving the stands of cotton the distance apart for future cultivation and to insure the most rapid and satisfactory growth.

The invention consists in the improved construction, arrangement, and combination of parts, which will be hereinafter fully described, and particularly pointed out in the claims.

In the drawings hereto annexed, Figure 1 is a perspective view of a machine constructed in accordance with my invention. Fig. 2 is a longitudinal sectional view of the same. Fig. 3 is a vertical transverse sectional view, taken through the chopper blades or holes and looking in a forward direction. Fig. 4 is a rear elevation.

Like numerals of reference indicate like parts in all the figures.

1 designates the front axle, and 2 the rear axle. The front axle is provided with spindles 3, upon which the transporting-wheels 4 are loosely journaled. The rear axle 2 is journaled in suitable bearings in the rear uprights of the frame, and is provided with the transporting-wheels 5, permanently secured thereon. The front uprights of the frame 6 are secured to the axle 1, and are connected with the rear uprights 7 by means of longitudinal braces 8 and 9. Transverse braces 10 and 11 connect the front uprights 6 and the rear uprights 7, respectively, thus completing the rectangular frame structure, as will be seen in the drawings.

Suitably mounted upon the transverse braces 11, connecting the rear uprights of the frame, is a vertical bar 12, the lower end of which has a bearing for the rear end of a shaft 13, the front end of which is journaled in the lower end of a bar 14, the upper end of which is pivotally connected with a lever 15, which is pivoted upon the upper cross-brace 10, which connects the front uprights of the frame. The point of attachment of the pivoted rod 14 to the lever 15 is in rear of the fulcrum of the latter, so that by manipulating the said lever the operator may raise or lower the said rod 14 and with it the front end of the shaft 13, the rear end of which latter is journaled loosely in the bar 12, so as to permit such adjustment to be made. The shaft 13 is provided near its rear end with radially-extending arms or spokes 16, adapted to be engaged by similar arms or spokes 17, extending radially on the revolving rear axle, thus causing a rotary motion to be transmitted from the latter to the shaft 13 when the machine is in operation. Said shaft 13 is provided with a radially-extending handle 18, carrying chopping-hoes 19 of any suitable construction.

The operation of my invention will be readily understood from the foregoing description, taken in connection with the drawings hereto annexed. When the machine progresses over the field, the rear axle revolves in its bearings in the rear uprights of the frame and serves to transmit a rotary motion to the longitudinally-arranged shaft 13, carrying the chopping-hoes, which are thereby operated to thin the rows of growing plants along which the machine is driven, the said machine being of course arranged to straddle the row. By manipulating the lever 15 the shaft 13 may be adjusted when desired to raise the chopping-hoes to such a height as not to engage the plants.

The general construction of the machine is very simple and inexpensive, and by the use of this device the cotton crop may be thinned or chopped more rapidly, evenly, and accurately than it would be possible to do by hand-labor.

Having thus described my invention, what I claim is—

1. In a cotton-chopper, the combination of a frame structure composed of four uprights connected by longitudinal and transverse braces, the front axle secured to the front uprights and having the revolving transporting-wheels, the rear axle mounted revolubly in the rear uprights and having the transporting-wheels mounted rigidly thereon, a longitudinally-arranged shaft journaled in arms or bars depending from the upper transverse frame-bars and carrying the chopping-hoes, and means for transmitting motion to said shaft from the rear axle, substantially as and for the purpose set forth.

2. In a cotton-chopper, the combination of the frame structure, the front axle having the revolving wheels, the revoluble rear axle having wheels mounted rigidly thereon, a vertical bar secured to the rear part of the frame and having a bearing at its lower end for one end of the longitudinally-arranged shaft, a vertically-movable bar having a bearing for the front end of said shaft, a lever pivoted to a front cross-bar of the frame and connected with said vertically-movable bar, the chopping-hoes mounted upon the longitudinal shaft, and means for transmitting motion to the latter from the rear axle of the machine, substantially as and for the purpose set forth.

In testimony that I claim the foregoing as my own I have hereto affixed my signature in presence of two witnesses.

NEELY TRIMMIER HENDERSON.

Witnesses:
W. S. GLASS,
A. F. DONALDSON.